3,244,752
PROCESS FOR PREPARING SUBSTANTIALLY
PURE RHODINAL
Emile H. Eschinasi, Montclair, N.J., assignor to Givaudan Corporation, New York, N.Y., a corporation of New Jersey
No Drawing. Filed Aug. 29, 1961, Ser. No. 134,582
7 Claims. (Cl. 260—601)

The present invention relates to a process for preparing substantially pure rhodinal and derivatives thereof such as rhodinol, rhodinal acetals and rhodinyl esters, as well as to certain novel products made thereby.

Rose-otto, the very valuable, hard-to-get essential oil of roses, has caused a sustained demand for natural-smelling rose materials such as commercial rhodinol preparations derived from costly oil of geranium Bourbon.

It is noteworthy, however, that no commercial or practical preparation of pure rhodinol or its aldehyde, rhodinal, has ever been made, in contradistinction with pure preparations of their commonly available isomers, citronellol and citronellal, which provide a cheap but less-fragrant source of rose odor.

An earlier attempt by Barbier and Locquin (Compte Rendus 157, 1114 (1913) to prepare pure rhodinol was not successful. Because of unseccessful prior attempts to prepare pure rhodinol, its structure became the object of so great a controversy that until recently it was considered practically impossible to distinguish and separate the rhodinyl, or α-(isopropenyl) form, and the citronellyl, or β-(isopropylidene) form, of citronellol and rhodinol, as well as their corresponding aldehydes, citronellal and rhodinal. This led authorities such as J. L. Simonsen ("The Terpenes," vol. I, University Press, Cambridge (1947), pp. 35, 37, 73–75 and 80) to conclude that the alcohols, as well as their corresponding aldehydes, were either identical or existed in nature as a non-separable mixture of the α and β forms.

In accordance with the present invention, I have succeeded in preparing a substantially rich mixture of rhodinal and in isolating substantially pure rhodinal from such mixtures or other mixtures, containing citronellal, with or without isopulegol. Also, I have confirmed that rhodinal has the formula: 3,7-dimethyl-7-octenal, in contradistinction with citronellal, which has the formula: 3,7-dimethyl-6-octenal. The two formulae may be represented as follows:

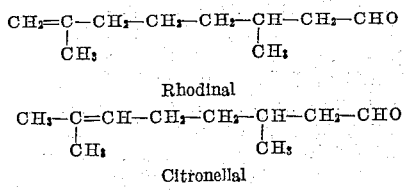

Rhodinal

Citronellal

In one aspect, the process of this invention comprises treating a mixture containing rhodinal and citronellal, with or without isopulegol, with a borating agent at an elevated temperature in the presence of a catalyst which selectively favors the isomerization of citronellal into isopulegol without affecting rhodinal. The pure rhodinal is then isolated from the mixture by distilling it from the resulting isopulegol borate.

The starting mixture, comprising rhodinal and citronellal, with or without isopulegol, may be obtained in any convenient manner. I prefer, however, to employ, as the starting material, rhodinal-rich mixture I obtained by dehydrating hydroxy citronellal in the presence of a mineral oxide catalyst such as CaO, BaO, SrO, MgO and $Al_2O_3$ or a mixture thereof at an elevated temperature. Indeed, the preparation of such a mixture represents another aspect of my present invention. While this starting mixture may be prepared by the so-called batch method, it is preferred to prepare it by a continuous method, involving passing hydroxycitronellal at a rate of about 100 to 200 grams per hour over a bed of about 200 grams of a catalyst. A temperature within the range from about 150° C. to about 400° C. gives satisfactory results, temperatures between about 275° C. and 375° C. being preferred. The preferred starting material contains about 75% by weight of rhodinal, the balance being isopulegol (about 13%) and citronellal (about 12%).

The relative proportions of rhodinal and citronellal in the starting mixture used in accordance with the process of this invention may vary over wide limits, the only limitation being practical ones. Thus, for example, there is little purpose in attempting to isolate rhodinal from a mixture in which it only represents a very minor percentage, such as 1%, although, if desired, such a separation can be effected. As a practical matter, commercial use of the process is not indicated if the rhodinal content of the mixture is less than about 20%. As already noted, it is preferred to use a composition containing at least 75% of rhodinal, the balance being citronellal and isopulegol, as the starting material. Indeed, this mixture by itself may be used in perfume compositions to reproduce more truly the rose odor than is the case with pure citronellal.

Borating agents which may be employed in accordance with the present invention include, preferably, boric acid in all its forms, such as boric anhydride, metaboric acid, orthoboric acid hydrates. Also lower alkyl borates such as methyl, ethyl or isopropyl borates may be used, if desired.

As aforementioned, the catalysts which may be employed to obtain pure rhodinal in accordance with this invention are those which selectively isomerize citronellal to isopulegol, without affecting rhodinal. Among these are included silica gel ($SiO_2$); phenol; mono-, di- and tri-alkyl phenols, e.g., cresols, xylenols, thymol and trimethyl phenol; boric acid; aliphatic acids, e.g., formic acid, acetic acid, propionic acid, butyric acid and valeric acid; the mono-alkyl esters of said aliphatic acids having up to 5 carbon atoms in the alkyl group; dicarboxylic acids, e.g., oxalic acid, malonic acid and succinic acid; the mono-alkyl and di-alkyl esters of said dicarboxylic acids having up to 5 carbon atoms in the alkyl groups; hydroxy acids and esters, e.g., citric acid and its monoalkyl- di-alkyl- and tri-alkyl esters having up to 5 carbon atoms in the alkyl groups; aromatic acids and esters, e.g., benzoic acid, toluic acids, and their mono-alkyl esters having up to 5 carbon atoms in the alkyl group; and phthalic acids and their mono-alkyyl- and di-alkyl esters having up to 5 carbon atoms in the alkyl groups.

While boric acid may be used as the borating agent and as the isomerization catalyst, it is preferred to employ it along with one of the other aforementioned catalysts, in order to obtain better practical results.

The temperatures at which the present process for converting citronellal in the aforementioned rhodinal-containing mixtures or into isopulegol, may be conducted vary over wide limits. Temperatures within the range from about 100° C. to about 200° C. may be employed. I presently prefer to conduct the process at temperatures within the range from about 120° C. to about 160° C.

The process of the present invention, involving the conversion of citronellal in rhodinal-containing mixtures into isopulegol, requires reaction periods which depend, inter alia, on the particular catalyst used, the amount of catalyst used and the temperature of the reaction. For example, at a temperature such as 150° C. and in the presence of SiO$_2$ to the extent of 3% by weight of the citronellal originally present in the mixture, it requires about 8 hours for over 90% of the citronellal present to be isomerized to isopulegol. At 100° C. the reaction time would be 6 to 7 times longer to proceed to the same extent. If the amount of SiO$_2$ used is equal to the weight of the citronellal originally present in the mixture the reaction is substantially complete within 1 hour at 150° C. In a continuous process, if a rhodinal-citronellal mixture is passed over SiO$_2$ at 100° C. at a rate of 100 g. of citronellal per 100 g. of SiO$_2$ per hour the conversion to isopulegol is 65%; at 150° C. the conversion reaches 95%.

If desired, hydrocarbon solvents such as benzen and toluene may be employed in the present process, although their use is not essential.

The proportion of borating agent employed varies in accordance with the total amount of citronellal and isopulegol present in the starting mixture. It is preferred to use equivalent amounts of reagent to avoid any undesirable formation of by-products. Thus, for example, the amount of reagent employed is equal to that amount which contains one-third the number of atoms of boron as is represented by the total number of moles of citronellal and isopulegol in the starting material.

The amount of isomerizing catalyst employed in accordance with the present process may vary widely. I have found that for practical results, at least 3% by weight, based on the weight of citronellal present in the starting mixture, should be used. While there is no upper limit of catalyst which may theoretically be employed, it is preferred to employ in a continuous process about the same weight of catalyst as the weight of citronellal in the original mixture.

It was unexpected that rhodinal and citronellal would react differently in the process of this invention. For one thing, purification of rhodinal by means of its bisulfite compound is practically impossible because of the great tendency to sulfonate irreversibly, thus destroying the rhodinal. Then too, the close chemical similarity of rhodinal and citronellal and their previous resistance to separation both pointed to the great likelihood that the reactivity of these aldehydes would likely be substantially the same. I have attempted to ascertain the reason for the unexpected difference in behavior of the aldehydes in the process of this invention, and, without wishing to be bound thereby, I offer the following explanation.

Unlike citronellal, the conjugate acid of rhodinal does not provide the proper electron density to the corresponding 4 carbon required to induce the undesirable p-menthanic cyclization to isopulegol. This is illustrated in the following reaction sequences:

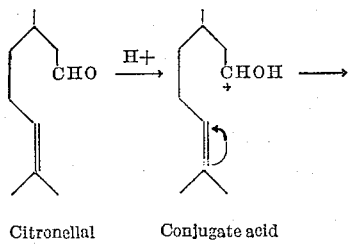

Citronellal    Conjugate acid

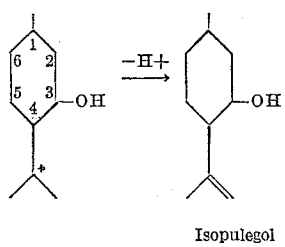

Isopulegol

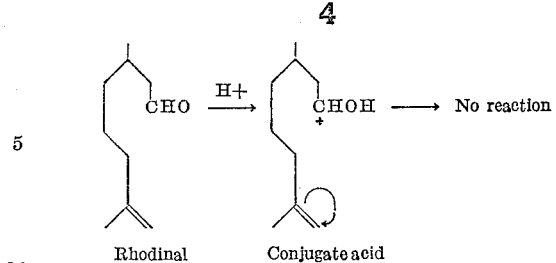

Rhodinal    Conjugate acid

This is in contradistinction with Simonsen's proposed mechanism of isomerization which would have predicted rhodinal to isomerize more readily than citronellal.

The substantially pure rhodinal made in accordance with the present process has a distinctly different, more refined and true rose odor than its isomer, citronellal. The presence of just a few percent of citronellal, with its pungent melissa and citronellal odor, subdues and covers the fine rosy, aliphatic smell of the substantially pure rhodinal, i.e., rhodinal of at least 90 percent purity. In like manner, the delicate, honey-rose odor of substantially pure rhodinol is adversely affected by a few percent of the sharper but less fragrent citronellol.

It has been found that the formyl, acetyl and ispropyl esters of rhodinal possess unusual odor qualities, making them especially suitable for use as practical perfume agents.

Rhodinyl acetate has a rich and fragrant honey rose note with five times the estetic desirability of citronellyl acetate.

Rhodinyl formate has a rich and natural-smelling rose leaf note with five times the esthetic desirability of the corresponding citronellyl formate.

The invention is further illustrated by the following examples, without, however, limiting it to them. The temperatures are given in degrees centigrade.

EXAMPLE 1

Eight hundred thirty grams hydroxycitronellal (Laurine® Givaudan) $n_D^{20}$ 1.4480; $\alpha_D^{25}$+9.75°, is introduced at a rate of 100 ml. per hour at 350° into a Pyrex column, 100 cm. long and 25 mm. in diameter, containing 200 g. of ¼-8″ mesh activated alumina (Aluminum Co. of America). The reaction product (758 g. $n_D^{20}$ 1.4485) is separated from the water (71 ml.) and distilled. Crude rhodinal (528 g.) $n_D^{20}$ 1.4480; B.P. 55-60° at 1 mm. is collected. It shows by gas liquid chromatographic analysis 75% rhodinal; 12% citronellal and 13% isopulegol. The residue of 210 g. consists mainly of unreacted hydroxycitronellal good for reworking.

The crude distilled rhodinal (528 g.) containing a total of about 25% citronellal-isopulegol mixture is mixed with 16 g. of boric anhydride; 5 g. of silica gel and 300 ml. of toluene and is then refluxed at 130-135° with a Dean Stark trap. After about one hour, no more water (ca. 8 ml.) is formed and the solvent is evaporated. The pure rhodinal is then distilled from the residual isopulegol borate in a 95% yield, B.P. 51° at 1.4 mm., $n_D^{20}$ 1.4410; $\alpha_D^{25}$+9.75°. It shows a rhodinal content of over 98-99% with only traces of isopulegol present, semicarbazone M.P. 73° from ethanol, 2,4-dinitrophenylhydrazone M.P. 73-74° from ethanol.

Analysis.—Semicarbazone $C_{11}H_{21}N_3O$—calculated: C, 62.51; H, 10.02; N, 19.98; found: C, 62.62; H, 10.08; N, 20.10. Dinitrophenylhydrazone $C_{16}H_{22}N_4O_4$—calculated: C, 57.48; H, 6.63; N, 16.76; found: C, 57.48; H, 6.49; N, 16.98.

EXAMPLE 2

Rhodinol

Rhodinal (103 g.), $n_D^{20}$ 1.4410, $\alpha_D$+9.75° in 100 ml. dry ether was added to a solution of lithium aluminum hydride (8 g.) in dry ether (250 ml.) within 15 minutes. The reaction mixture was refluxed for one hour, then decomposed with 5 ml. of ethyl acetate followed by 100 ml. of water. The slurry was then carefully acidified with diluted sulfuric acid, washed with water, and neutralized. After evaporation of the solvent, the rhodinol was carefully distilled in a 100 cm. Connon-packed(Ni) column and the main cut (70 g.) was collected at 79° at 1.7 mm.; $n_D^{20}$ 1.4520; $\alpha_D^{25}+2.5°$. The infrared spectrum shows strong methylenic (C=CH$_2$) absorption bands at 6.1 and 11.3μ.

EXAMPLE 3

Rhodinol

Rhodinal (154 g.), 75 g. of aluminum isopropoxide and dry isopropanol (500 ml.) were refluxed for four hours while acetone (70 ml.) was collected at 56–58°; then isopropanol (300 ml.) was distilled at 80–88° and the residue worked out with aqueous acetic acid. After distillation, a main cut of 120 g. d-rhodinal, B.P. 79° at 1.7 mm., $n_D^{20}$ 1.4520, $\alpha_D^{25}+2.5°$ was obtained; it showed an infrared curve identical with that of rhodinol obtained in Example 2.

EXAMPLE 4

Rhodinyl formate

To a mixture of 98% formic acid (15 g.) and acetic anhydride (10 g.) kept around 15–20°; rhodinol (16 g.) is slowly added in 5–10 minutes and the reaction mixture is stirred for an additional two hours at 25°; then water (100 ml.) is added for washing the excess acids and the rhodinyl formate is separated, neutralized with aqueous Na$_2$CO$_3$, and distilled. The main portion of the ester (17 g.) distills at 72° C. at 1.8 mm. pressure, $n_D^{20}$ 1.4408, $\alpha_D^{25}+2$. The gas chromatography shows a purity of about 98% formate and 1.2% acetate.

EXAMPLE 5

Rhodinyl acetate

A mixture of rhodinol (50 g.), acetic anhydride (75 g.) and anhydrous sodium acetate (10 g.) is refluxed at 140° for three hours. After cooling, 200 ml. of water was added to decompose the excess anhydride. The crude acetate was then separated, neutralized with aqueous Na$_2$CO$_3$, and distilled. The main portion of the ester (62 g.) distilled at 74° C. at 1 mm. pressure, $n_D^{20}$ 1.4388, $\alpha_D^{25}+2.5°$.

*Analysis.*—Calculated for $C_{12}H_{22}O_2$: C, 72.69; H, 11.18. Found: C, 72.82; H, 11.07.

The foregoing illustrates the practice of the invention, which, however, is not to be limited thereby but is to be construed as broadly as permissible in view of the prior art and limited solely by the appended claims.

I claim:

1. The process of making pure rhodinal which comprises reacting, at a temperature within the range from about 100° C. and about 200° C., a mixture, consisting essentially of rhodinal and citronellal, with a borating agent selected from the group consisting of boric acid, boric acid anhydride and a lower alkyl borate, said borating agent being present in a ratio of about one-third the number of atoms of boron to the total number of moles of citronellal and isopulegol in the starting mixture, in the presence of a catalyst for the selective isomerization of citronellal to isopulegol, wherein said catalyst is at least one member selected from the group consisting of silicon dioxide, phenol, a monoalkyl phenol, a dialkyl phenol, a trialkyl phenol, boric acid, formic acid, acetic acid, propionic acid, butyric acid, valeric acid and their mono-alkyl esters in which said alkyl group has up to five carbon atoms; oxalic acid, malonic acid and succinic acid and their mono-alkyl and di-alkyl, said catalyst being present in an amount of at least about 3 percent, by weight, based on the weight of the citronellal present in the starting mixture, until substantially all of the citronellal has been converted to isopulegol, and separating the unchanged rhodinal from the resulting isopulegol borate.

2. The process of claim 1, wherein said mixture also contains isopulegol.

3. The process of claim 1, wherein the reaction is conducted at a temperature between about 120° C. and 160° C.

4. The process of claim 2, wherein the starting mixture comprises at least 75% of rhodinal, the balance being citronellal and isopulegol.

5. The process of making rhodinal which comprises heating a mixture consisting of 75% of rhodinal, 12% of citronellal and 13% of isopulegol with boric anhydride in the presence of silica gel at 130°–135° C. for about one hour, and distilling off rhodinal.

6. The process which comprises heating hydroxy-citronellal in the presence of alumina at a temperature from about 275° C. and 400° C. and removing a mixture comprising citronellal, isopulegol and at least 75% of rhodinal from the reaction chamber.

7. The process of claim 6, wherein the hydroxycitronellal is passed in a continuous manner over Al$_2$O$_3$ at the rate of 100 to 200 grams per hour of the former for each 200 grams of the latter.

References Cited by the Examiner

UNITED STATES PATENTS

| | | | |
|---|---|---|---|
| 2,003,684 | 6/1935 | Frantz | 167—94 |
| 2,015,239 | 9/1935 | Schrauth | 167—94 |
| 2,117,414 | 5/1938 | Glass | 260—601 |
| 2,449,994 | 9/1948 | Gresham et al. | 260—488 |
| 2,475,204 | 12/1948 | Brooks | 260—488 |
| 2,577,445 | 12/1951 | Bortnick | 260—601 |
| 2,577,867 | 12/1951 | Wendler et al. | 260—601 |

LEON ZITVER, *Primary Examiner.*

CHARLES B. PARKER, *Examiner.*